US005484062A

United States Patent [19]
Rich

[11] Patent Number: 5,484,062
[45] Date of Patent: Jan. 16, 1996

[54] ARTICLE STACK HANDLER/SORTER

[75] Inventor: Donald S. Rich, Long Valley, N.J.

[73] Assignee: Technology Handlers, Inc., Long Valley, N.J.

[21] Appl. No.: 402,798

[22] Filed: Mar. 13, 1995

Related U.S. Application Data

[63] Continuation of Ser. No. 8,127, Jan. 22, 1993, abandoned.

[51] Int. Cl.⁶ ........................................................ B07C 5/00
[52] U.S. Cl. ........................ 209/587; 209/936; 209/921
[58] Field of Search ........................................ 209/559, 598,
209/706, 587, 936, 934, 933, 939, 925,
921, 909; 414/797.5, 797.4, 797.6, 798.1,
798.2, 792.7, 788.8; 53/53, 54

[56] References Cited

U.S. PATENT DOCUMENTS

| | | | |
|---|---|---|---|
| 3,421,638 | 1/1969 | Locke et al. | 414/797.5 X |
| 3,771,649 | 11/1973 | Strauss | 209/936 X |
| 4,454,947 | 6/1984 | Jacobsmeyer et al. | 209/936 X |
| 4,702,660 | 10/1987 | Niehaus et al. | 414/797.5 X |
| 4,743,154 | 5/1988 | James et al. | 414/797.5 X |
| 4,814,072 | 3/1989 | Von Wichert et al. | 209/936 X |
| 4,865,515 | 9/1989 | Dorner et al. | 414/797.5 X |
| 4,907,701 | 3/1990 | Kobayashi et al. | 209/939 X |
| 4,997,552 | 3/1991 | Schlinkmann et al. | 209/921 X |
| 5,033,251 | 7/1991 | Rodriguez | 209/936 X |

FOREIGN PATENT DOCUMENTS 0290877  11/1988  European Pat. Off. ............ 209/936

*Primary Examiner*—D. Glenn Dayoan
*Attorney, Agent, or Firm*—Rohm & Monsanto

[57] ABSTRACT

A handler/sorter for articles such as the trays of integrated circuit chips is provided with an unstacking elevator system, an inspection station, a sorting station for repopulating the tray with non-defective integrated circuit chips, and an output station. The output station has a stacking elevator which is essentially the mirror image of the unstacking elevator at the input station, reducing the number of different parts. The elevators employ pneumatic or linear motor drives which gently place the trays on the conveyor shuttles, without rattling the integrated circuit chips. In an optical inspection embodiment, a focussing elevator is provided at the inspection station. The focussing elevator operates in response to focus control signals issued by a scanning camera system. Transportation between the respective stations is provided by a pair of conveyor shuttles which employ linear motors. Such motors, which are computer controlled, have advantageously adjustable acceleration characteristics and ride smoothly on a bearing of air. In operation, the handler/sorter performs its functions at the respective stations substantially independent of one another, resulting in greater throughput.

18 Claims, 4 Drawing Sheets

ARTICLE STACK HANDLER/SORTER

This application is a continuation of application Ser. No. 08/008,127 filed on Jan. 22, 1993, now abandoned.

BACKGROUND OF THE INVENTION

1. Field of the Invention

This invention relates generally to systems for conveying articles between a plurality of stations, and more particularly, to an arrangement for transporting trays containing integrated circuits from a tray stack to a testing station, and then to a selectable one of a tray repopulation station or an output stacking station.

2. Description of the Related Art

Integrated circuit chips are provided to certain manufacturers of electronic equipment in trays which hold a plurality of such chips. In practice, the trays typically may each hold some 50 to 100 integrated circuit chips, in respective wells therein. The trays each have a respective height, and are configured to be stackable. Preferably, all of the integrated circuit chips on a tray are disposed on the same side, i.e., all tops up, and oriented identically, for example, the number "1" lead of the chip at the upper left corner of the well in the tray.

Generally, the original equipment manufacturers (OEMs) desire to test the integrated circuit chips in a variety of modes before assembling product therewith. One such test mode is optical inspection wherein a computer-assisted camera identifies the orientation of the integrated circuit chips and identify ones of the chips which are out of conformance, such as the electrical leads of each integrated circuit chip being in conformance with a predetermined specification. After inspection, the particular ones of the integrated circuit chips which are out of conformance are identified and thus precluded from being employed in the product.

Conventional systems for transporting trays of integrated circuit chips to and beyond an inspection station will generally employ a linear, or conveyor belt, approach to the task, whereby the transportation of a tray is not interruptible in mid cycle. Thus, if a disturbance should occur during cycling of the known apparatus, it will be necessary to restart the entire cycle.

In addition to the foregoing, known transport arrangements subject the trays to various mechanical shocks during handling. Such mechanical shocks disturb the placement of the integrated circuit chips in their respective wells in the trays, resulting in higher reject rates. It is to be remembered that some integrated circuit chips contain leads which are extremely close to one another, usually on the order of a few thousandths of an inch. There is therefore the ever present possibility that a mechanical shock will bend the delicate leads of the integrated circuit chips either laterally into one another, or out of their common plane, which would create difficulty with surface mounted devices in particular.

There is additionally a need for a transport system which operates smoothly so as to minimize vibration which could have a deleterious effect on the inspection process. A stable platform must be provided in order to effect the inspection, which involves high resolution patterns.

Several known arrangements employ screw drive transport systems. These known arrangements suffer from the disadvantages of drift, whereby accurate placement of the shuttle is quite difficult, particularly over extended periods of time, and limited control over shuttle acceleration and deceleration. There is a need for a system for transporting articles between stations where high placement accuracy can consistently be achieved, and also where velocity-versus-time contours can be controlled with precision over predetermined distances of shuttle travel.

Still other known article transport arrangements employ a mechanical arm which removes the article from a stack and delivers same to a testing station. In some known arrangements, a second mechanical arm removes the article from the testing station and places it in an output stack. As is well-known, a fully programmable mechanical arm requires a very significant amount of individualized software to perform even a simple function. Such systems are very complicated and require highly trained personnel to effect even minor modifications to a preprogrammed function. In the alternative, robotic arms which eliminate the need for extensive programming are generally hardware specific and cannot readily be adapted to perform new or modified functions.

It is, therefore, an object of this invention to provide a system for transporting trays of integrated circuit chips between a plurality of stations wherein the trays are reliably unstacked and the integrated circuit chips processed or inspected without being subjected to mechanical shock which would cause the integrated circuit chips on the tray to be displaced.

It is another object of this invention to provide an unstacking arrangement wherein the stacked articles are unstacked onto a conveyor arrangement, during which unstacking the motion of the articles is always controlled.

It is also an object of this invention to provide an unstacking arrangement wherein the stacked articles are not dropped onto a conveyor arrangement.

It is a further object of this invention to provide a multi-station apparatus for inspecting integrated circuit chips arranged in trays, identifying defective ones of the integrated circuit chips, and repopulating the trays with conforming ones of the integrated circuit chips.

It is additionally an object of this invention to provide a multi-station apparatus wherein inspection of integrated circuit chips arranged in trays for identifying defective ones of the integrated circuit chips is performed substantially independently of the repopulation of previously inspected one of the trays with conforming integrated circuit chips.

It is yet a further object of this invention to provide a simple and economical system for exchanging defective or non-conforming articles in a tray with conforming articles.

It is also another object of this invention to provide a system of transporting trays of integrated circuit chips to an inspection station wherein various functions of the system are independent of one another.

It is yet an additional object of this invention to provide a system of transporting trays of integrated circuit chips to a high resolution optical inspection station, wherein the transport system operates very smoothly so as to minimize vibration at the inspection station.

It is still another object of this invention to provide an article transport arrangement which can achieve a consistently high degree of accuracy in placement of a conveyor unit at preselected stations.

It is a yet further object of this invention to provide an article transport arrangement in which the acceleration characteristics of the shuttle can advantageously be controlled simply.

It is also a further object of this invention to provide an article transport arrangement which does not suffer from the drawbacks associated with screw drive systems.

SUMMARY OF THE INVENTION

The foregoing and other objects are achieved by this invention which provides an apparatus for conveying articles between a plurality of stations. In accordance with the invention, an unstacking arrangement is provided at an article receiving station for receiving a stacked plurality of the articles. A first conveyor unit, which in some embodiments of the invention may be a shuttle, receives a first article from the unstacking arrangement and transports the first article to an article examination station. A second conveyor unit receives the first article at the article examination station and transports same to and output station. Subsequently, an output stacking arranged at the output station for receives the first article from the second conveyor unit.

In accordance with a specific illustrative embodiment of this apparatus aspect of the invention, an unstacking elevator raises and lowers the stacked plurality of the articles with respect to the first conveyor unit. An article release arrangement releases the first article, as a lowermost article of the stacked plurality of the articles, onto the first conveyor unit. In some embodiments, the unstacking elevator is provided with pneumatic actuation drive. Alternatively, it is provided with a motor drive.

In a further embodiment of the invention, the article release arrangement is provided with a plurality of selectably extendable and retractable support elements for communicating with the first article and selectably coupling with and releasing same. Upon being released, the first article is deposited on the first conveyor unit, which may incorporate a linear motor. In such embodiments, the second conveyor unit may also include a linear motor.

In a preferred embodiment of the invention, the stacked articles are each a tray populated with subarticles, the first article being a first tray of subarticles, and there is further provided a tray repopulation system arranged intermediate of the article examination station and the output station for replacing a defective one of the subarticles in the first tray with a replacement subarticle.

In one highly advantageous embodiment of the invention, the tray repopulation system is provided with a subarticle supply for providing a supply of non-defective subarticles. Also, there is provided a defective subarticle storage arrangement, which may be a tray, for receiving defective ones of the subarticles. A subarticle transporter transports defective ones of the subarticles, if any, from the first tray, and repopulates the first tray with non-defective ones of the subarticles from the article supply. The tray repopulation system is further provided with a coupling arrangement for coupling the subarticle supply and the defective subarticle storage arrangement to the second conveyor unit for controlling motion along a first axis.

In accordance with a further apparatus aspect of the invention, an unstacking system for articles is provided with an elevator for raising and lowering a stack of the articles. A retractable support installed on the elevator supports the stack of the articles. A lowermost travel of the elevator is defined by a first limiter. A second limiter defines a first extent of upward travel of the elevator, the first extent of the upward travel corresponding to a predetermined height of the articles. A delimiter is provided for releasing the second limiter, whereby the elevator is permitted to travel upward by a second extent of upward travel which is additional to the first extent.

The elevator in this aspect of the invention may be raised and lowered in response to actuation of a pneumatic drive. However, in other embodiments, a linear motor drive may be employed. Linear motors are generally computer controlled, and accordingly, in such an embodiment, the delimiter corresponds to one or more information states in the computerized control unit.

In accordance with a method aspect of the invention, a method of sorting articles arranged on trays, includes the steps of:

unstacking an input stack of the trays with the articles thereon by releasing a lowermost first tray of the input stack of the trays onto a first conveyor unit;

first transporting the first tray on the first conveyor unit to an inspection station;

identifying unacceptable ones of the articles on the first tray which are out of conformance with predetermined specifications;

second transporting the first tray on a second conveyor unit to an output stacking station; and stacking the first tray at the output station by adding the first tray to the bottom of an output stack of the trays.

In some embodiments of the invention, the step of identifying includes the further step of operating an optical focussing elevator. Such an elevator may be responsive to focussing signals derived from a computer which controls the operation of the optical inspection camera. This permits the inspection camera to remain stationary, thereby improving its ability to perform a high resolution inspection.

In certain embodiments of this method aspect of the invention, prior to performing the step of second transporting, there is provided the further step of populating the first tray with articles which are in conformance with the predetermined specifications. Unacceptable ones of the articles in the first tray are replaced with the articles which are in conformance with the predetermined specifications. During the repopulation process, a further tray is simultaneously moved with the second conveyor unit. This is achieved in a preferred embodiment of the invention by interlocking a carrier of the further tray to the second conveyor unit.

BRIEF DESCRIPTION OF THE DRAWING

Comprehension of the invention is facilitated by reading the following detailed description, in conjunction with the annexed drawing, in which.

DETAILED DESCRIPTION

Figure 1:
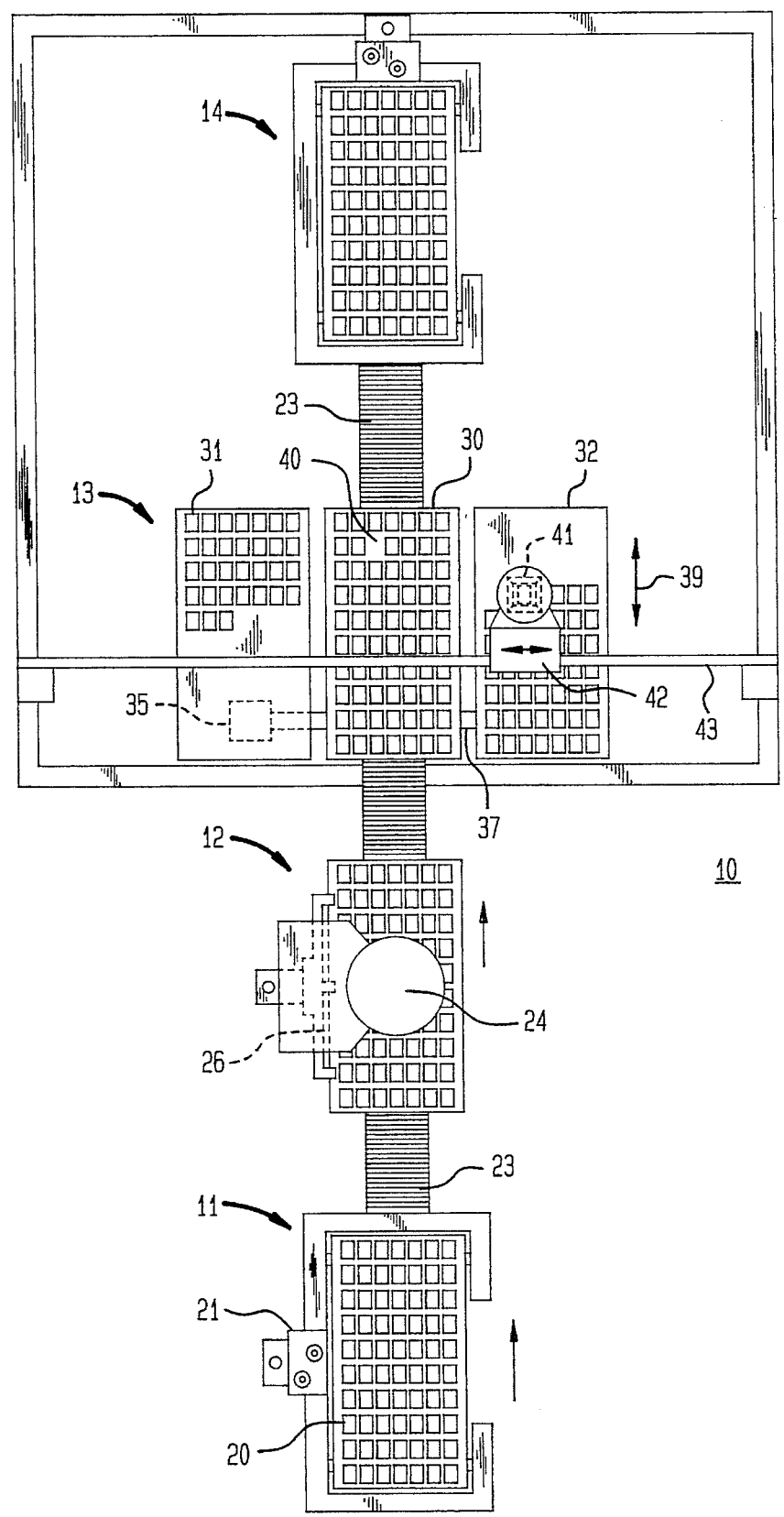
FIG. 1 is an overall schematic plan representation of a specific illustrative embodiment of a handler system constructed in accordance with the principles of the invention.

FIG. 1 is an overall schematic plan representation of a specific illustrative embodiment of a handler system constructed in accordance with the principles of the invention. The specific illustrative embodiment of the invention set forth in this disclosure is directed to the handling and sorting of integrated circuit chips, which, as will be described herein, are provided in stacked trays. As shown in the figure, and integrated circuit chip handler system 10 is provided with an input station 11, an inspection station 12, a sorting station 13, and an output station 14. These four stations form the component systems of the illustrative embodiment. The general, or overall operation of handler system 10 is as follows:

An input stack of trays 20 is deposited on an input elevator 21. In this specific embodiment, each of the trays in input stack of trays 20 is arranged to contain seventy integrated circuit chips arranged in a rectangular seven-by-ten array. Each integrated circuit chip is accommodated in a corresponding well in the tray. Of course, the particular capacity of the trays, and their configurations, do not in any way limit the scope of the present invention. Moreover, the present invention is useful in the handling of articles generally, and it is intended that the scope of the invention not be limited to any particular type of article.

Figure 2:
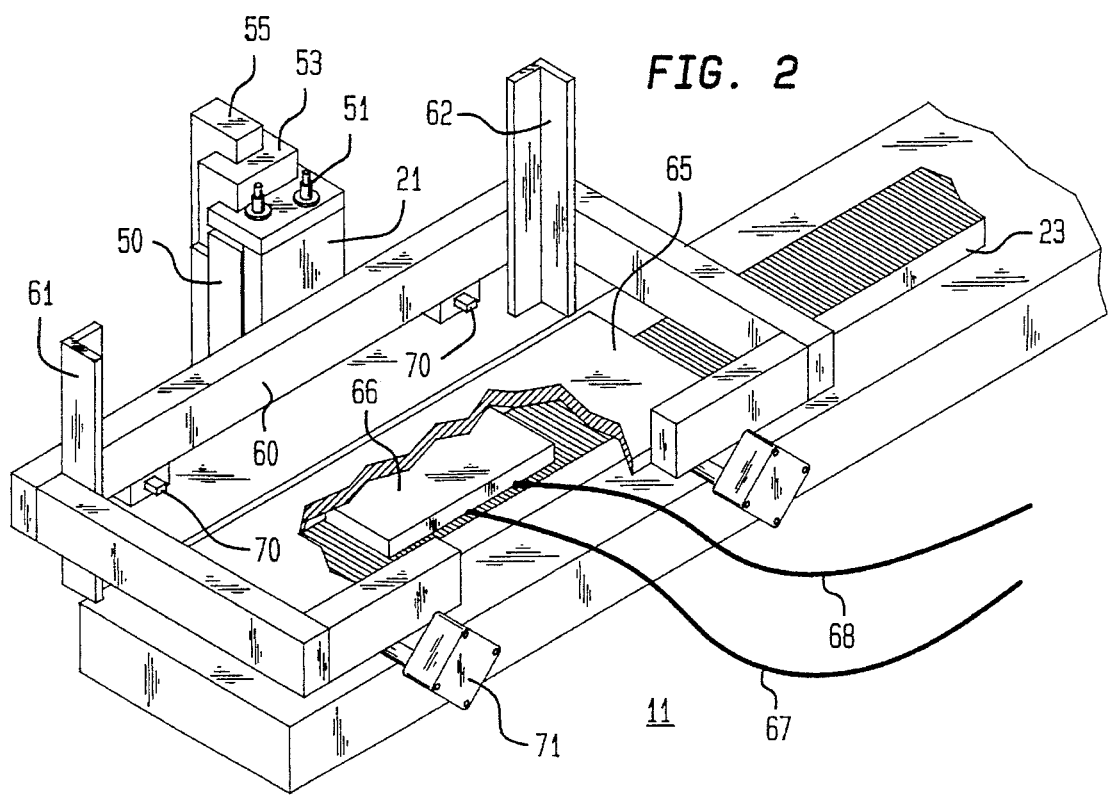
FIG. 2 is a partially fragmented isometric schematic illustration of an elevator arrangement which is useful in the practice of the invention and constructed in accordance with the principles of the invention.

Input station 11 is an unstacking arrangement wherein lowermost ones of the tray are deposited onto a first conveyor shuttle (not shown in this figure) which transports the tray to inspection station 12. The conveyor shuttle, which will be described hereinbelow with respect to FIG. 2, is a linear motor which is operated on a rail. Linear motors which can be employed in the practice of the invention are the L-20 motors driven by the L-Series Drives under control of the Model 4000 Motion Controller, or equivalents, manufactured by the Compumotor Division of the Parker-Hannifin Corporation.

In the specific embodiment, the inspection station is intended to perform an optical inspection of the integrated circuit chips on the tray using, in this embodiment, an inspection camera 24. In other embodiments of the invention, however, other types of operations may occur at the inspection station, such as electrical testing. In fact, the operations performed at inspection station 12 need not be of an inspection or testing nature at all, and may be in the nature of a work operation performed on the articles, such as painting, printing, physical rotation or reorientation, etc. The inspection station of the present embodiment is provided with a focussing elevator 26 (partially hidden) whereby tray 27, which is the tray undergoing inspection, is raised or lowered in response to electrical signals (not shown) from inspection camera 24 which indicate the need for focussing. This permits camera 24 to be firmly mounted without suffering the effects of vibration or other undesired motion derived from an incorporated focussing lens drive.

At inspection station 12, as tray 27 is raised by focussing elevator 26, the first conveyor shuttle (not shown in this figure) returns to input station 11, where the next lowermost tray (not shown) is deposited thereon. A second conveyor shuttle (not shown), which may be quite similar to the first conveyor shuttle, is located, in the present state of handler system 10, under a tray 30. Tray 30 was previously inspected at inspection station 12, and was transported to sorting station 13 by the second conveyor shuttle.

Several operations occur at sorting station 13, the overall purpose of such activity being the removal and replacement of integrated circuit chips in tray 30 which were determined during the inspection at inspection station 12 to have been out of conformance with predetermined criteria, such as misalignment of the electrical leads. First, previously inspected tray 30 is brought adjacent to a source tray 31 which is stocked with previously examined conforming integrated circuit chips, and a depository tray 32 which ultimately will be filled with non-conforming (or defective) integrated circuit chips removed from the trays undergoing repopulation. An interlock solenoid 35 from source tray 31 extends toward the second conveyor shuttle (not shown) under tray 30, and a correspondingly similar interlock solenoid 37 extends from depository tray 32 toward the second conveyor shuttle. Source tray 31 and depository tray 32 each are therefore coupled to the second conveyor shuttle, and therefore are moved by same in the direction of arrow 39. In some embodiments of the invention, trays 31 and 32 are installed on a common undercarriage whereby the move simultaneously in the direction of arrow 39. Only one interlock solenoid is required to ensure that both trays move simultaneously with the second conveyor shuttle (not shown).

A pickup head 41 is arranged on a conveyor shuttle 42 which travels along a rail 43. Pickup head 41 may be operated to pick up the integrated circuit chips on the trays using a vacuum. Conveyor shuttle 42 may be a linear motor, of the type previously described. Thus, pickup head 41 travels in a direction orthogonal to the motion of trays 30, 31, and 32 under control of the second conveyor shuttle.

In order to explain the operation of sorting station 13, assume that integrated circuit chip 40 on tray 30 was determined during the inspection to be non-conforming and therefore to be removed and replaced. Pickup head 41 is moved by conveyor shuttle 42 so that it is aligned with the third column of integrated circuit chips on tray 30. Tray 30 itself is moved by the second conveyor shuttle (not shown) so that the second row of integrated circuit chips of tray 30 is directly under pickup head 41. The pickup head then is lowered to communicate with integrated circuit chip 40, and the applied vacuum causes the integrated circuit chip to be removed by the pickup head. As shown, subsequent motion of pickup head 41 and the trays will place the pickup head directly over the next available well in depository tray 32, where the non-conforming integrated circuit chip is deposited. In similar fashion, pickup head 41 and the trays are moved so that the pickup head obtains a previously examined and conforming integrated circuit chip from source tray 31, and deposits same in the open space on tray 30. Thus, tray 30 is repopulated with conforming integrated circuit chips.

Thus, as shown, handler system 10 conducts three operations simultaneously, i.e., loading of the next lowermost tray at input station 11, inspection of tray 27 at inspection station 12, and repopulation of tray 30 at sorting station 13. These operations occur substantially independently of one another, greatly improving system throughput.

After tray 30 has been completely repopulated with good integrated circuit chips, the source and depository trays are then unlatched, and the repopulated tray is stacked at output station 14. Output station 14 is configured substantially as the mirror image of input station 11. More specifically, input station 11 unstacks an input stack of articles by removing the stacked article from the bottom of the stack, as will be discussed hereinbelow. Output station 14, on the other hand, stacks the articles by adding articles to the bottom of the output stack.

FIG. 2 is a partially fragmented isometric schematic illustration of input station 11 with input elevator 21 which is constructed in accordance with the principles of the invention. Elements of structure which bear analogous correspondence to elements previously described are correspondingly designated. Input elevator 21 is coupled to an actuator 50 which is schematically illustrated herein and which drives the elevator up and down. In this specific illustrative embodiment, actuator 50 is pneumatically operated, and adapted to receive its input air at air inlets 51. It is to be understood that other drive arrangements for the elevator can be employed in the practice of the invention, such as a linear motor. The elevator is coupled to a stop block 53 which limits the travel of the elevator is multiple ways, as described herein. The additionally further shows a further limiter 55 which is movable in the up and down directions, and which limits the extent of upward travel of stop block 53.

Figure 3:
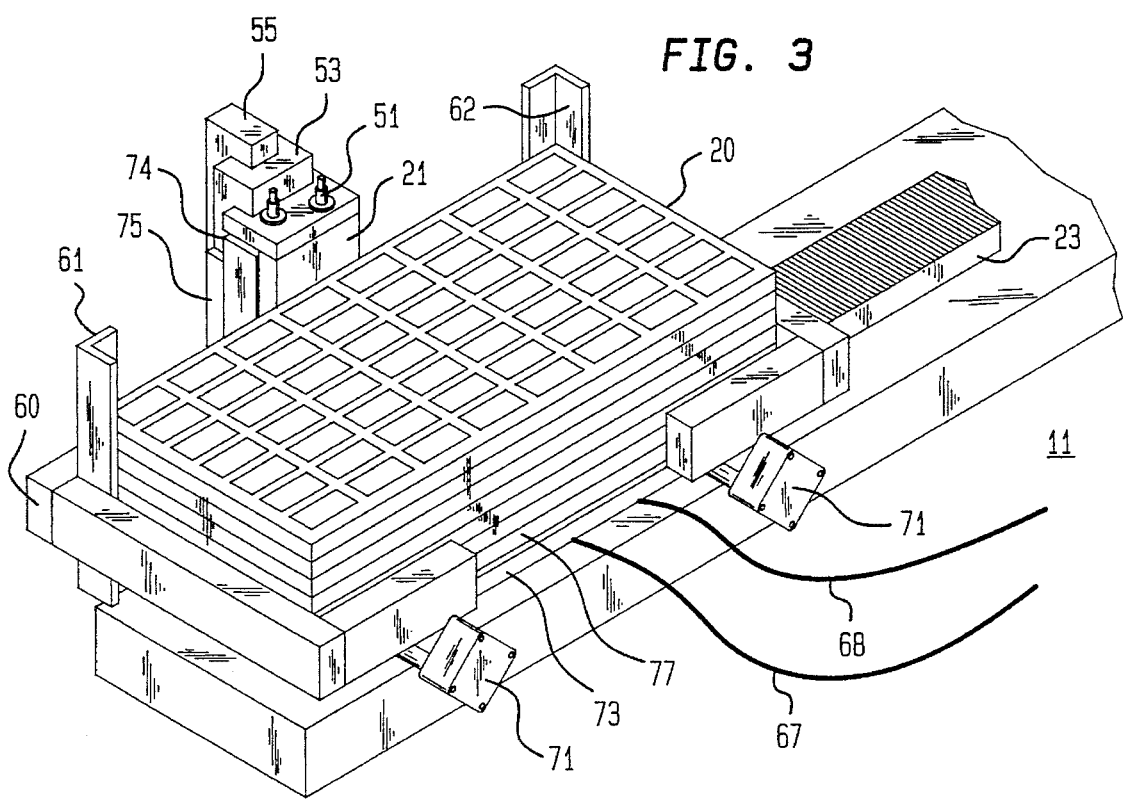
FIG. 3 is a schematic isometric representation of the embodiment of the elevator arrangement of FIG. 2, further showing a plurality of trays if integrated circuit chips stacked thereon.

Input elevator 21 is coupled to a frame 60 which, as shown in FIG. 3, supports a stack of the article to be handled by handler system 10. FIGS. 2 and 3 show that frame 60 is provided with stack guides 61 and 62 for assisting in maintaining input stack of trays 20 upright, particularly during acceleration of the first conveyor shuttle. The first conveyor shuttle, which is shown partially fragmented in FIG. 2, is formed of a shuttle platform 65 which is installed, in this embodiment, on a linear motor 66. Lines 67 and 68 supply compressed air and electrical control signals and power to linear motor 66. The compressed air is used in an air bearing between the linear motor and rail 23.

The trays are supported in the elevator, in this embodiment, by four retractable support elements 70. Each of the support elements is controlled by an associated one of solenoids 71 which, in this embodiment, are pneumatically actuated. In operation, input elevator 21 is lowered until the lowermost tray 73 is gently placed on shuttle platform 65. This corresponds to the lowermost position of the elevator, by operation of stop block 53, which is configured to have its lowermost surface meet elevator support 75, precluding further downward travel. At this point, retractable support elements 70 are retracted, permitting lowermost tray 73, as well as the remainder of input stack of trays 20, to rest on shuttle platform 65. The elevator is then raised by an amount which corresponds exactly to the height of the lowermost tray. This distance is defined by the distance between the top surface of stop block 53 and the underside of further limiter 55. Retractable support elements 70 are then extended to engage with tray 77 which is immediately above lowermost tray 73. Further limited 55 is then raised, permitting the elevator to be raised by an additional amount and the conveyor shuttle to be moved toward inspection station 12.

Figure 4:
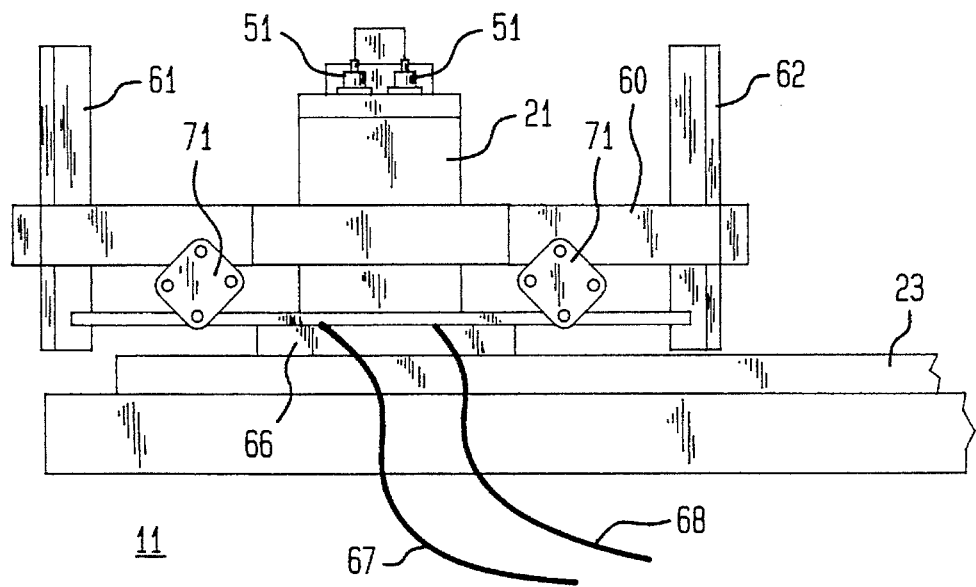
FIG. 4 is a side view of the embodiment of the elevator of FIG. 2.

FIG. 4 is a side view of the embodiment of the elevator of FIGS. 2 and 3. This figure illustrates the relationship between the conveyor shuttle platform 65 and the structure of elevator 21. As shown, platform 65 is arranged between stack guide 61 and 62, to ensure that the stack of trays (not shown in this figure) is properly oriented thereon.

Figure 5:
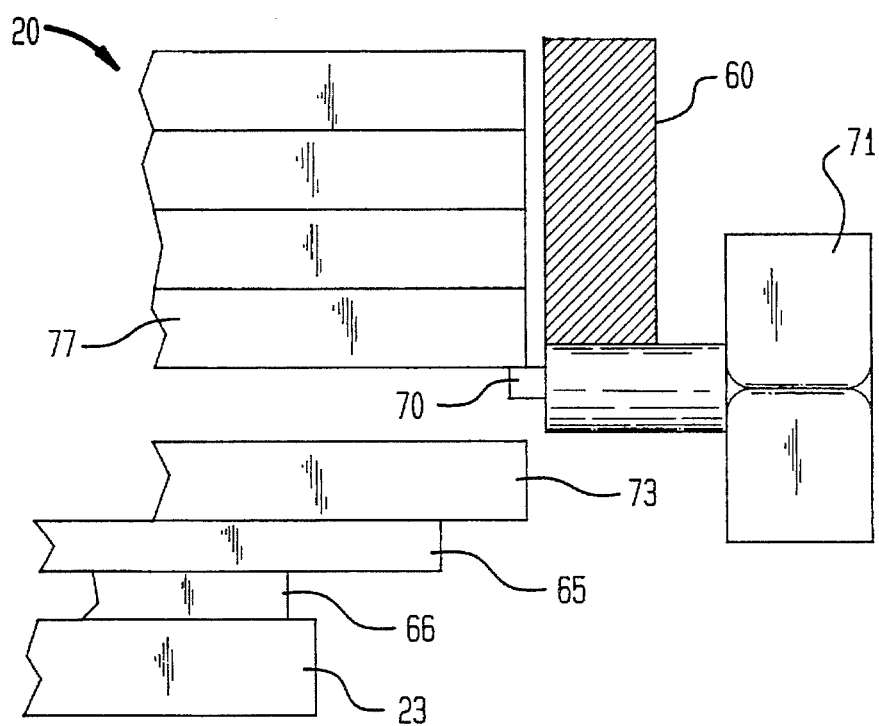
FIG. 5 is a fragmented schematic representation showing enlarged detail of the retractable support elements of the elevator embodiment of FIG. 2.

FIG. 5 is a fragmented schematic representation showing enlarged detail of the retractable support elements of the elevator embodiment of FIGS. 2, 3, and 4. This figure shows tray 77 engaged on one of retractable support elements 70 and raised off of lowermost tray 73. The lowermost tray is shown deposited on platform 65 of the first conveyor shuttle. As explained herein, it is a significant advantage of the present invention that the lowermost tray is deposited on the conveyor shuttle in a gentle way, without dropping. This greatly reduced the mechanical shocks and vibrations delivered to the trays which would dislodge some of the integrated circuit chips from their wells in the tray, possibly bending their leads.

Figure 6:
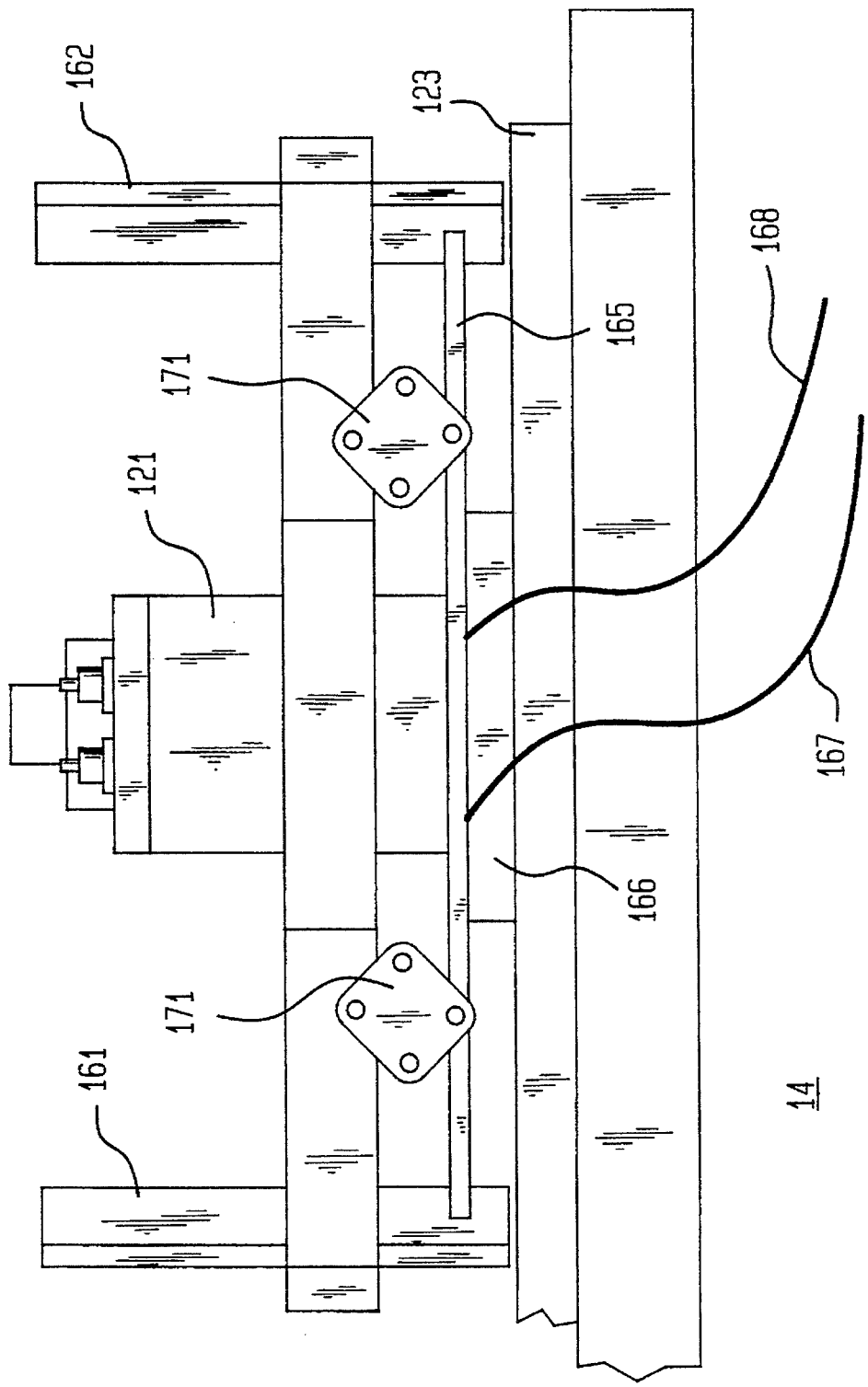
FIG. 6 is a side view of the stacking arrangement at output station 14.

FIG. 6 is a side view of the embodiment of the elevator of output station 14, which in this specific illustrative embodiment of the invention, is structurally identical to the elevator of FIGS. 2, 3, and 4. FIG. 6 illustrates the relationship between a conveyor shuttle platform 165 and the structure of an elevator 121. As shown, platform 165 is arranged between stack guides 161 and 162, to ensure that the stack of trays (not shown in this figure) is properly oriented thereon. The trays (not shown) are supported in the elevator, in this embodiment, by four retractable support elements (not shown in this figure), which correspond structurally and functionally to retractable support elements 70, described hereinabove with respect to FIG. 2. Each of the support elements is controlled by an associated one of solenoids 171 which, in this embodiment, are pneumatically actuated, as previously described. In operation, input elevator 21 is lowered until the lowermost tray (not shown) is gently placed on shuttle platform 165 which is installed, in this embodiment, on a linear motor 166. Lines 167 and 168 supply compressed air and electrical control signals and power to linear motor 166. The compressed air is used in an air bearing (not shown) between the linear motor and a portion of a rail 123, in the manner previously described.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An apparatus for conveying articles between a plurality of stations, the apparatus comprising:

conveyor guide means for defining a conveyor path;

unstacking means arranged at an article receiving station for receiving a stacked plurality of the articles;

first shuttle means for receiving a first article from said unstacking means and transporting said first article on said conveyor guide means to an article examination station along a first portion of said conveyor path;

second shuttle means for receiving said first article at said article examination station and transporting same to an output station, said first and second shuttle means being operable independently of one another; and stacking means arranged at said output station for receiving said first article from said second shuttle means, said unstacking means and said stacking means being operable independently of one another.

2. The apparatus of claim 1 wherein said unstacking means comprises:

unstacking elevator means for raising and lowering said stacked plurality of the articles with respect to said first shuttle means; and article release means for releasing said first article, as a lowermost article of said stacked plurality of the articles, onto said first shuttle means.

3. The apparatus of claim 2 wherein said unstacking elevator means is provided with pneumatic actuation means.

4. The apparatus of claim 2 wherein said unstacking elevator means is provided with motor drive means.

5. The apparatus of claim 2 wherein said article release means comprises a plurality of selectably extendable and retractable support elements for communicating with said first article and selectably coupling with and releasing said first article.

6. The apparatus of claim 1 wherein said first shuttle means comprises a linear motor.

7. The apparatus of claim 1 wherein said second shuttle means comprises a linear motor.

8. The apparatus of claim 1 wherein the articles are each a tray populated with subarticles, said first article being a first tray of said subarticles, and there is further provided tray repopulation means arranged intermediate of said article examination station and said output station for replacing a defective one of said subarticles in said first tray with a replacement subarticle.

9. The apparatus of claim 8 wherein said tray repopulation means comprises:

subarticle supply means for providing a supply of non-defective subarticles;

defective subarticle storage means for receiving defective ones of said subarticles; and subarticle transport means for transporting defective ones of said subarticles, if any, from said first tray, and repopulating said first tray with non-defective ones of said subarticles from said article supply means.

10. The apparatus of claim 9 wherein said tray repopulation means further comprises coupling means for coupling said subarticle supply means and said defective subarticle storage means to said second conveyor means for controlling motion along a first axis.

11. A method of sorting articles arranged on trays, the method comprising the steps of:

unstacking an input stack of the trays with the articles thereon by releasing a lowermost first tray of said input stack of the trays onto a first shuttle unit;

first transporting said first tray on said first shuttle unit along a first portion of a conveyor guideway to an inspection station;

identifying unacceptable ones of the articles on said first tray which are out of conformance with predetermined specifications;

second transporting said first tray on a second shuttle unit along a second portion of a conveyor guideway to an output stacking station, wherein said steps of first and second transporting are performed independently of one another; and stacking said first tray at said output station by adding said first tray to the bottom of an output stack of the trays, wherein said steps of unstacking and stacking are performed independently of one another.

12. The method of claim 11 wherein prior to performing said step of identifying there is provided the further step of operating an optical focussing elevator.

13. The method of claim 11 wherein prior to performing said step of second transporting there is provided the further step of populating said first tray with articles which are in conformance with said predetermined specifications.

14. The method of claim 13 wherein said step of populating comprises the further step of replacing said unacceptable ones of the articles in said first tray with said articles which are in conformance with said predetermined specifications.

15. The method of claim 13 wherein said step of populating comprises the further step of moving a further tray simultaneously with said second shuttle unit.

16. The method of claim 15 wherein said step of moving comprises the further step of interlocking a carrier of said further tray to said second shuttle unit.

17. An apparatus for conveying trays populated with articles between a plurality of stations, the apparatus comprising:

unstacking means arranged at a tray receiving station for receiving a stacked plurality of the trays;

first conveyor means for receiving a tray from said unstacking means and transporting the tray to an article examination station;

second conveyor means for receiving the tray at the article examination station and transporting same to an output station;

stacking means arranged at the output station for receiving the tray from said second conveyor means; and tray repopulation means arranged intermediate of the article examination station and the output station for replacing a defective one of the articles in the tray with a replacement article.

18. A method of sorting articles arranged on trays, the method comprising the steps of:

unstacking an input stack of the trays with the articles thereon by releasing a lowermost first tray of said input stack of the trays onto a first conveyor unit;

first transporting said first tray on the first conveyor unit to an inspection station;

identifying unacceptable ones of the articles on the first tray which are out of conformance with predetermined specifications;

second transporting the first tray on a second conveyor unit to an output stacking station;

populating the first tray with articles which are in conformance with the predetermined specifications; and stacking the first tray at the output station by adding the first tray to the bottom of an output stack of the trays.

* * * * *